United States Patent
Gidge

[15] 3,671,709
[45] June 20, 1972

[54] HEAT SEALING OF POROUS MATERIALS

[72] Inventor: Lester Gidge, Nashua, N.H.
[73] Assignee: Monsanto Company, St. Louis, Mo.
[22] Filed: Sept. 14, 1970
[21] Appl. No.: 71,656

[52] U.S. Cl..........................219/10.53, 219/10.81, 156/274
[51] Int. Cl..........................................................B23k 13/02
[58] Field of Search..............219/10.53, 10.81; 156/73, 274

[56] References Cited

UNITED STATES PATENTS

| | | | |
|---|---|---|---|
| 2,632,724 | 3/1953 | Lumbard | 219/10.53 X |
| 2,822,454 | 2/1958 | Rothstein | 219/10.53 |
| 2,920,172 | 1/1960 | Stallard | 219/10.53 |

*Primary Examiner*—J. V. Truhe
*Assistant Examiner*—Hugh D. Jaeger
*Attorney*—J. Bowen Ross, Jr., Russell E. Weinkauf, John D. Upham and Neal E. Willis

[57] ABSTRACT

An apparatus for seam bonding layers of fabric by radio frequency power is provided with electrodes at least one of which is flanked by and is recessed in a resilient insulating member which acts to fill the voids in the fabric during bonding and resultingly prevents electrical arcing through the fabric.

5 Claims, 3 Drawing Figures

Patented June 20, 1972
3,671,709
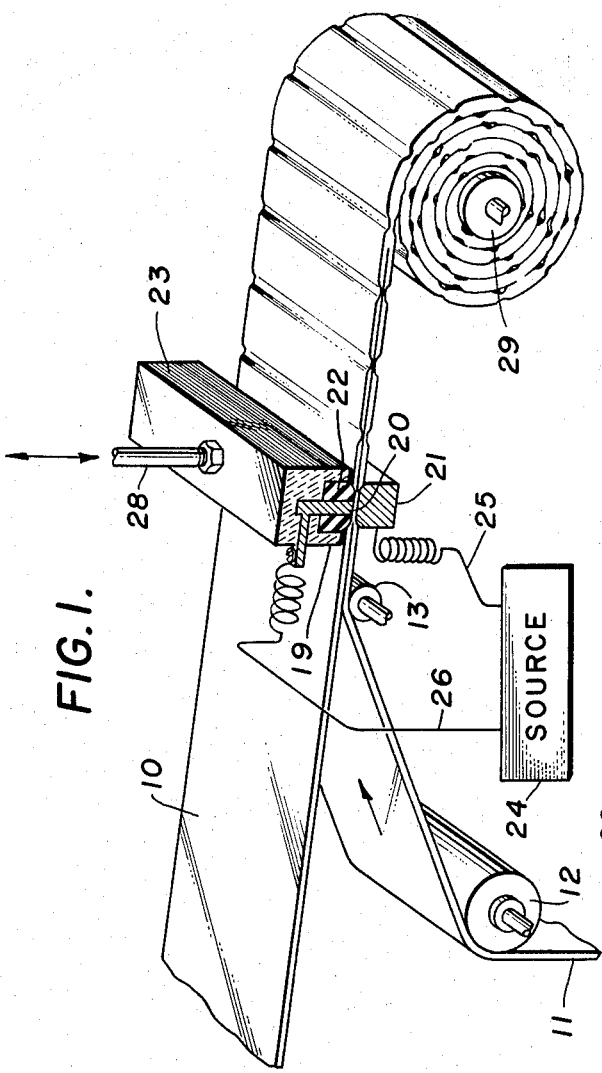
INVENTOR.
LESTER GIDGE
BY
ATTORNEY

HEAT SEALING OF POROUS MATERIALS

BACKGROUND OF THE INVENTION

1. Field of the Invention

This invention relates to the dielectric or radio frequency bonding of fabric comprised at least in part of a thermoplastic material and, particularly, to an apparatus for radio frequency seam bonding of porous thermoplastic fabrics by a method which prevents the electrical arcing through the openings in the fabric.

2. Description of the Prior Art

Thermoplastic dielectric materials heretofore have been joined together by applying the heating effects of an electrostatic field to overlapped material until the contiguous surfaces of the material are heat-softened, in which condition pressure is applied to effect a bond. The seam bonding of thermoplastic sheet material by means of electrodes which are flanked by a non-conductive material is taught in U.S. Patents Nos. 2,517,672; 3,188,259 and 2,621,138. However, the seam bonding of fabric containing a thermoplastic material by radio frequency power is, to date, unknown. The reason that fabric or other porous materials have not been adaptable for bonding by these techniques is that, as the potential is increased on the opposed electrodes, the air gaps in the fabric permit an electrical discharge, called arcing, through the same. Arcing results in the burning of the fabric. Even where continuous thermoplastic sheet material is bonded, a slight pinhole or the like in the material will cause arcing therethrough. Thus, if arcing could be eliminated, bonding of fabric or porous thermoplastic material could be accomplished by radio frequency means and it is to this end that this invention is directed.

SUMMARY OF THE INVENTION

While this invention is adaptable for use on any article containing thermoplastic materials, the molecules of which become excited when exposed to radio frequency power, and through which arcing normally occurs, it is most adaptable for use on synthetic spunbonded fabrics as described in U.S. Pats. Nos. 3,516,900; 3,276,944 and 3,341,394. The apparatus is generally comprised of a pair of movable electrodes; means for supplying radio frequency power to the electrodes; and a resilient insulating member, such as a silicone rubber, which flanks one selected electrode with that electrode being recessed a distance therein. The fabric layers to be bonded are placed between the electrodes. The electrodes are capable of moving towards each other to compress the fabric layers into intimate contact such that bonding occurs upon the activation of the electrodes with radio frequency power. The silicone rubber of the selected electrode first engages the fabric layer adjacent to it and, as pressure is applied, is compressed and fills the voids within the fabric. The filling of the voids within the fabric is tantamount to the removal of the air from the fabric and without air, arcing cannot take place. Since arcing occurs only along the sides of the electrodes, it is only necessary to insure that air is removed from the area in proximity to the electrode sides. Upon completion of the compression step, the end of the electrode flanked with the resilient member becomes substantially flush with the same and also engages the fabric. Of course, the flanked electrode works against the other electrode which acts as a base of compression for the resilient insulating member. With the resilient insulating member having been compressed and with the electrodes in contact with the fabrics to be bonded, the electrodes are energized with radio frequency power. Heat is generated locally in the fabrics by this energy dissipation and the fabric fuses in the area directly beneath the electrodes. With external pressure being applied, the thermoplastic material flows together to form a film-like weld. Cooling of the fabrics below the fusion or stick point of the thermoplastic material results in a bond being formed between the fabric layers which is comprised of fused thermoplastic material.

Thus, therefore, an object of this invention is to provide means for the radio frequency bonding of porous thermoplastic articles.

Another object of this invention is to provide a process for seam bonding layers of thermoplastic non-woven fabrics.

A further object of this invention is to provide an apparatus for the bonding of fabric layers comprised of thermoplastic fibers by filling the voids of the fabric prior to bonding to prevent arcing between opposed electrodes.

DESCRIPTION OF THE DRAWINGS

FIG. 1 is a perspective view of the apparatus constructed in accordance with the principles of the instant invention;

FIG. 2 is an exploded view showing the electrodes in a position to engage two fabric layers; and FIG. 3 is the view of FIG. 2 with the electrodes having moved into contact with the fabric and showing the resilient insulating member in intimate contact with the fabric to prevent arcing.

DETAILED DESCRIPTION OF THE PREFERRED EMBODIMENT

While the fabrics to be seam bonded together may be woven and may be comprised of many thermoplastic materials, such as nylon and vinyl based fibers having been sprayed with a heat softenable thermoplastic material such as polyacrylonitrile, it is contemplated that fabrics 10 and 11 are continuous filament spunbonded nylon webs for these webs best illustrate the novel features of this invention.

In reference to the drawings, non-woven fabrics 10 and 11 are drawn directly from separate supply rolls (not shown) and come in contact with each other as they pass over roller 13. Roller 12, which is optional, serves as a guide to align fabric 11 in its approach to roller 13. When a more intimate contact between fabrics 10 and 11 is desired, another roller (not shown) may be placed vertically above and parallel with roller 13 and cooperate therewith to form a nip. Once fabrics 10 and 11 are in contact, they are adapted to be bonded in accordance with this invention.

As shown in FIG. 1, the bonding apparatus includes first and second electrodes 20 and 21, a resilient insulating member 22 within which electrode 20 is recessed and housing block 23 which includes housing arms 19. Housing arms 19 secure electrode 20 and resilient insulating member 22 in their respective positions and cooperate with electrode 20 to provide a guide for limiting the lateral expansion of resilient member 22 during compression. Electrodes 20 and 21 are adaptable for movement relative each other by joining housing 23 to rod 28 which in turn is connected to means for providing reciprocating motions and the necessary pressure needed to compress resilient insulating member 22. Radio frequency source 24 is connected to electrodes 20 and 21 by means of lines 26 and 25, respectively. Radio frequency source 24 is adaptable to produce the heat necessary to cause the fabrics to be fused in the areas beneath electrode 20.

As shown in FIGS. 2 and 3, fabrics 10 and 11 reside between electrodes 20 and 21. FIG. 2 represents the apparatus diagrammatically in a normal at rest position with the tip of electrode 20 being recessed in resilient insulating member 22. To reduce the radio frequency power requirements for bonding, electrode 20 may be heated to 285° F. to aid in bringing the fabric up to bonding temperature. FIG. 3 represents the electrode in the position to cause bonding between fabrics 10 and 11. With sufficient pressure which may range from 5 to 25 or more pounds per linear inch depending upon the softness of the fabric and the compressibility of resilient member 22, resilient insulating member 22 fills the voids within the fabric and thereby prevents arcing. Arcing between electrode 20 and electrode 21 occurs, if at all, along the exterior surfaces of the electrode 20 but not directly beneath the same. Therefore, with resilient insulating member 22 covering the sides of electrode 20 and penetrating the fabric, the air, which is necessary for an electrical discharge, is removed and arcing between the mentioned electrodes is prevented. The bonded fabric is then taken up on take-up roll 29 which moves incrementally to allow for bonding as shown in FIG. 1.

While not shown, the apparatus and process of this invention are easily adaptable to bond continuously layers of thermoplastic fabric along given seam lines by mounting the relative electrodes and resilient insulating members on rotating drums. Further, by the use of drums, various patterns can be achieved in the bonding of the fabric layers. This invention also contemplates the mounting of both electrodes in resilient insulating members especially where one fabric is lapped about itself and passed between the rotating electrodes to form a tubular article for use in sand bags or the like.

Therefore, while the preferred illustrative embodiment has been set forth, it is evident that there are alternative constructions which will be readily apparent to those skilled in the art for the invention resides in the fact that porous articles, such as woven and non-woven fabric comprised of thermoplastic polymers, may be bonded together by dielectric or radio frequency means without the fabrics being burned, the burning being caused by the electrical discharge or arcing between the working electrodes.

I claim:

1. An apparatus for the dielectric heat-sealing of porous articles in lamina form, said articles containing a thermoplastic material being readily excitable by radio frequency energy, said apparatus comprising a pair of relatively moving electrodes capable of compressing said articles into intimate contact with one of said electrodes being flanked by and being recessed in a resilient insulating member, said resilient member upon the compression of said articles work against the other electrode to engage said porous articles and substantially fill the voids therein, said flanked electrode having its face flush with said resilient insulating member while said members are in compression, means for moving said electrodes relatively towards each other and for compressing said resilient insulating member and means for supplying radio frequency power to said electrodes for bonding said thermoplastic materials.

2. The apparatus of claim 1 wherein said porous articles are layers of fabric.

3. The apparatus of claim 1 wherein said porous articles are layers of non-woven fabric.

4. The apparatus of claim 1 wherein said porous articles are layers of spunbonded fabric comprised of continuous nylon filaments.

5. The apparatus of claim 1 wherein said resilient insulating members are comprised of silicone rubber.

* * * * *